UNITED STATES PATENT OFFICE.

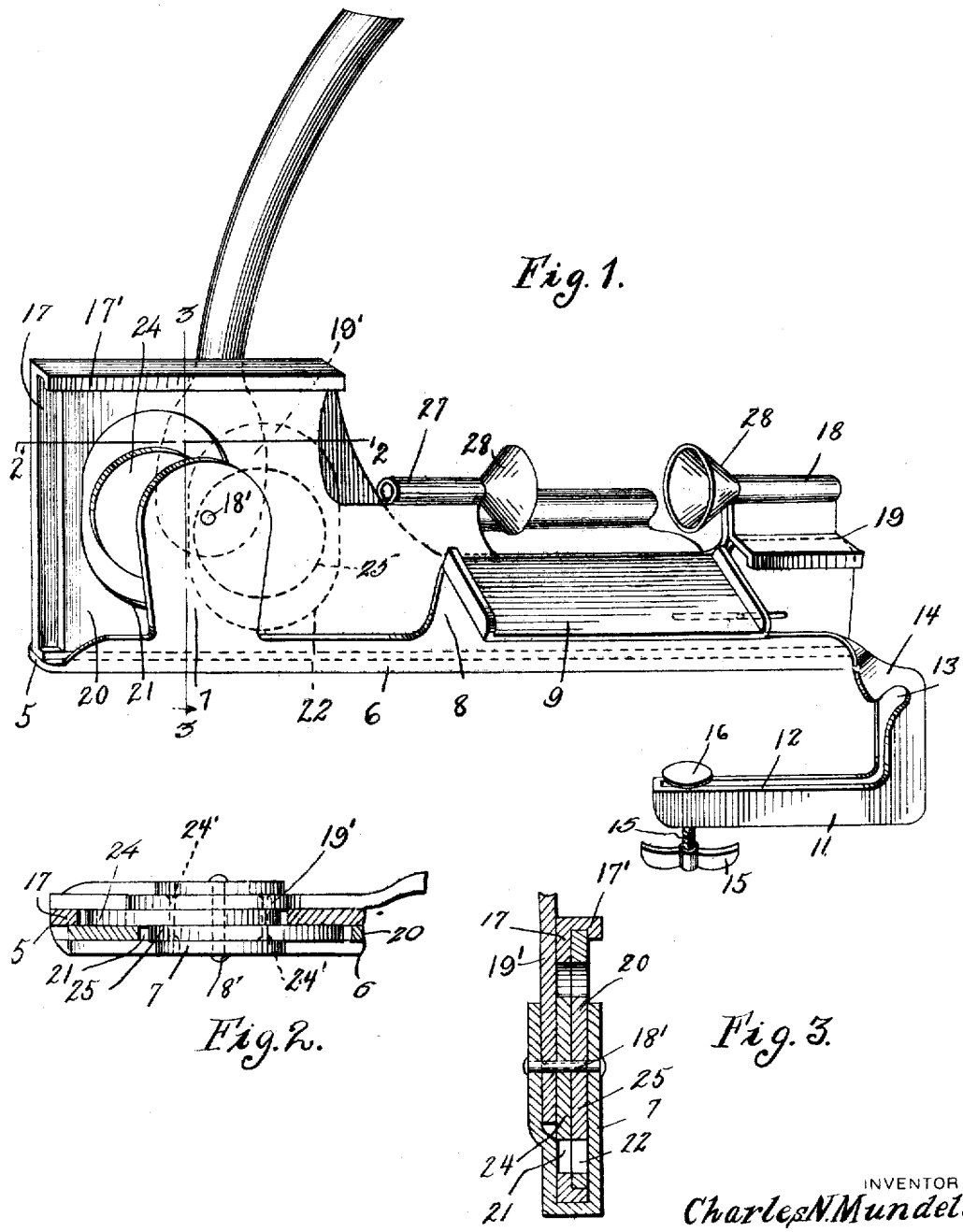

CHARLES N. MUNDELL, OF LOS ANGELES, CALIFORNIA.

ACTUATING MECHANISM FOR NUT-CRUSHERS.

1,269,632.  Specification of Letters Patent.  Patented June 18, 1918.

Application filed April 7, 1917. Serial No. 160,447.

*To all whom it may concern:*

Be it known that I, CHARLES N. MUNDELL, a citizen of the United States, residing at Los Angeles, in the county of Los Angeles and State of California, have invented certain new and useful Improvements in Actuating Mechanism for Nut-Crushers, of which the following is a specification.

My invention relates to crushing implements and more particularly to a nut crushing implement and has as its principal object to provide an improved implement of this sort which may be operated to effectively crush the nut or any other hard body with little physical effort.

A second object of the invention is to provide a nut cracking or crushing implement which is manually operated and which when operated engages the nut or other body at diametrically opposite points and thereby exerts a pressure upon the same from both sides.

An additional object of the invention is to provide a nut crushing implement which consists of few operating parts, is simple in construction and operation which may be easily assembled or disassembled, and which may be manufactured and placed on the market at a minimum cost.

The above recited objects, as well as others, are accomplished by means of the mechanism hereafter described, claimed and illustrated in the accompanying drawings in which:

Figure 1 is a perspective view of a nut crushing implement constructed in accordance with my invention.

Fig. 2 is a transverse sectional view taken on the line 2—2 of Fig. 1 and,

Fig. 3 is a vertical sectional view taken on the line 3—3 of Fig. 1.

Referring to the drawing in detail the numéral 5 designates the base of the nut cracking apparatus, and which is formed of an elongated metallic bar, having its longitudinal edges extended or bent upwardly as at 6 to provide between them a channel. Formed with this guide 6 adjacent one end of the base are spaced vertically extending ears 7, one of which is offset as shown in Fig. 3 of the drawings. The edges constituting the guides 6 are formed with vertical extensions 8, which are disposed in parallel relation for a relatively great distance and are then bent outwardly and in opposite directions to provide chutes 9 and 10. The transverse edges of one of these chutes are bent upwardly. The purpose of these chutes 9 is to direct the nuts that have been cracked into a suitable receptacle.

The metal constituting the base 5 is bent downwardly at one end and is extended inwardly beneath and parallel with the base to provide a bracket arm 11 which arm consists of spaced bars 12, one of which is provided with a notch 13 and a biting tooth 14. This notch 13 is adapted to accommodate the edge of the support, and the biting tooth 14 is adapted to be engaged with this support. Disposed between the bars 12 is a threaded stem 15 which carries a head 16 for binding engagement with the under face of the support.

Mounted for longitudinal sliding movement in the channel 6 is a vertically extending slide plate 17, having its upper longitudinal edge bent to assume a substantially inverted L-shaped guide 17'. The forward end of this slide is substantially wide, while its opposite end is considerably narrower and is bent upon itself adjacent its upper edge to provide a longitudinally disposed sleeve or socket 18, from which a laterally disposed guide 19 extends. The lower longitudinal edge of this slide plate is bent at right angles and disposed in the channel upon the base 5.

Mounted for rotation at one end on a pin or stub shaft 18' that extends transversely through the ears is an operating lever 19'. Movable along the slide 17 and having one edge engaged in the guide 17' and its opposite edge movable along the right angular extending portion at the lower end of this plate is a second slide plate 20 which is provided with a narrow portion that is engaged in the L-shaped guide 19 and moves longitudinally therein. These slides 17 and 20 are provided with cam or elliptical openings 21 and 22 respectively in which the eccentrics 24 and 25 operate. These cams rotate on the shaft or pin 18' and are fixed to the lever 19' by means of transverse pins 24'.

This slide 20 is formed with a sleeve or socket 27 which is longitudinally alined with the socket 18 formed on the slide 17. Both of these sockets or sleeves 18 and 27 receive removable nut receiving and holding elements 28. While I have illustrated these members in a specific shape they may be made in any desirable configuration and size so as to receive objects other than nuts.

The operation of my improved nut crushing implement is as follows: A nut is placed between the axially alined sleeves 18—27, and the lever 19 is rocked downwardly upon the pin 18' causing the eccentrics 24 and 25 to rotate and to engage the side walls of the cam opening in their respective slide plates, whereupon the said plates will be moved longitudinally toward each other and in opposite directions. This movement of the plates will bring the nut engaging members into engagement with the ends of the nut or other object confined between the same, whereupon the shell of the nut will be crushed. After the crushed nuts or other objects fall from the members 28 they will fall upon the discharge chute 9, and by placing receptacles at the lower ends of the said chutes, the crushed nuts will slide into the same.

This disclosure is merely illustrative and it is to be understood that I do not limit myself to the details hereinbefore set forth but it is obvious that the inventive idea may be embodied in other constructions without exceeding the scope of the herewith appended claims.

I claim:

1. In a nut cracker, a base, a pair of plates mounted for longitudinal sliding movement on said base and each plate having an opening therein, a shaft secured to said base and extending through said openings, a pair of oppositely disposed relatively small cams rotatably mounted on said shaft, each cam being adapted to engage with the walls of one of said openings, a lever connected to both of said cams for rocking the same, and an element carried by each plate.

2. In a nut cracker, a base bent to provide a longitudinally disposed channel, a pair of plates slidably mounted in said channel, the said plates having openings therein, ears projecting upwardly from said base and being disposed upon opposite sides of said plates, a pin connecting said ears and extending through said openings, a pair of cams disposed in opposite directions and being rotatably mounted on said pin, each cam being adapted to be engaged with the walls of one of said openings, a lever for rocking said cams, and elements carried by said plates.

3. In a nut cracker, a base, a plate slidably mounted on said base, a second plate slidably mounted on said first plate, the said plates being provided with openings, a pair of oppositely disposed cams supported by said base and one being disposed in each of said openings, means for rocking said cams, and an element carried by each of said plates.

4. In a nut cracker, a pair of longitudinally slidable plates having openings therein, a cam in each opening, the said cams being oppositely disposed and being substantially smaller than their respective openings, an element on each plate, and means for rotating said cams.

5. In a nut cracker, a base having a channel, a plate slidably arranged in said channel, a second plate slidably carried by the said first mentioned plate, each plate having an opening, a shaft supported by said base and extending through said openings, oppositely disposed cams rotatably mounted on said shaft, and one being disposed in each opening, means for rotating said cams simultaneously, a sleeve carried by each of said plates, the said sleeves being axially alined, and an element in each sleeve.

In testimony whereof I affix my signature in presence of two witnesses.

CHARLES N. MUNDELL.

Witnesses:
R. B. TREAT,
H. ACKERMAN.

Copies of this patent may be obtained for five cents each, by addressing the "Commissioner of Patents, Washington, D. C."